March 11, 1941.                S. H. FORSBERG                2,234,822
                    BEARING AND METHOD OF MAKING THE SAME
                           Filed Jan. 16, 1939
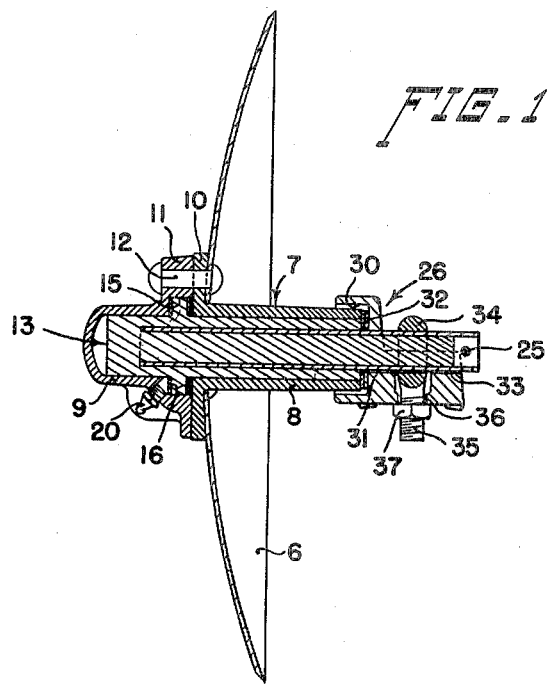
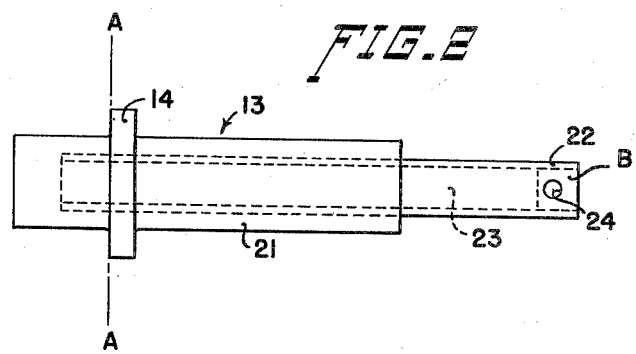
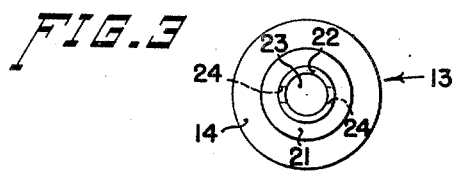
INVENTOR.
SWAN HENRY FORSBERG.
ATTORNEYS.

Patented Mar. 11, 1941

2,234,822

UNITED STATES PATENT OFFICE 2,234,822

BEARING AND METHOD OF MAKING THE SAME

Swan H. Forsberg, Moline, Ill., assignor to Deere & Company, Moline, Ill., a corporation of Illinois Application January 16, 1939, Serial No. 251,187

13 Claims. (Cl. 29—149.5)

The present invention relates to bearing members, and has as its principal object the provision of a simple, inexpensive bearing having a hard, wear-resistant bearing surface and a supporting shank or standard of relatively tough, ductile metal by means of which the bearing may be attached to an implement or vehicle frame, and a new and improved method of making the bearing.

In certain types of implements, such as listed corn cultivators and the like, it is customary to journal the ground working disks upon spindle bearings, and because of the extremely unfavorable conditions under which such bearings work, they are frequently made of chilled iron which is quite hard and resistant to abrasion. For most efficient operation of the disk, the bearing should be relatively small in diameter so that the maximum area of the disk may be effectively used, but at the same time, the bearing and supporting shank must have the toughness and strength to withstand the bending and twisting forces imposed upon the tool when the disk strikes rocks or other obstructions. One of the characteristics of chilled iron is that it is relatively brittle, and where the entire bearing and supporting shank is made of chilled iron, the unit is apt to lack strength unless made relatively large and massive. As pointed out above, this would be undesirable, and accordingly, efforts have been made to use steel for the supporting shank and chilled iron for the bearing surfaces, thereby combining the strength and toughness of steel with the hardness and wear resisting qualities of chilled iron.

Attempts were made to cast the chilled iron bearing with a steel shaft insert extending the length of the bearing and projecting outwardly from one end thereof to provide a supporting shank or standard. This method proved to be not entirely satisfactory, however, due to frequent cracking of the thin walls of the bearing sleeve as the metal cooled and shrank upon the unyielding steel rod. I have found that this difficulty is entirely eliminated, and a highly satisfactory bearing combining the best features of chilled iron and steel is produced by using a length of steel tubing instead of solid steel rod, and pouring the molten iron so as to fill the hollow center of the tube as well as the portion of the mold on the outside of the tube. Apparently, the reason for the success of my method is due to the almost instantaneous heating of the thin walls of the steel tubing, causing the tubing to expand very suddenly before the iron in the mold has solidified. Then, as the iron cools and contracts, the steel tubing cools and contracts at a similar rate and the result is that very little stress is set up in the chilled iron and the castings are almost invariably sound.

Another object of the present invention, therefore, is to provide a bearing member having a spindle portion of hard cast metal and a tubular shank portion of tough, ductile metal embedded within the spindle portion and projecting outwardly from one end thereof. More specifically, the present invention contemplates the provision of a method of making a bearing member in which a chilled iron sleeve of relatively thin wall section is cast upon a portion of a length of steel tubing, and some of the iron fills the hollow center of the tubing for a portion of the length thereof.

These and other objects and advantages of the present invention will become apparent after a consideration of the following detailed description of a preferred embodiment thereof, taken in conjunction with the accompanying drawing.

In the drawing:

Figure 1 is a sectional side view taken through a listed corn cultivator disk that is journaled on a bearing embodying the principles of my invention;

Figure 2 is an enlarged side elevation of the bearing member shown in section in Figure 1; and Figure 3 is an end view of the bearing, as seen from the right in Figure 2.

Referring now to the drawing, the reference numeral 6 indicates a circular, concavo-convex disk of the type used on listed corn cultivators, said disk having a hole in the center thereof through which a hub member 7 is passed. The hub member 7 preferably comprises an inner sleeve 8 and an outer cap 9 provided with flanges 10 and 11, respectively, that are joined together and securely fixed to the disk 6 by rivets 12.

The hub member 7 revolves on a spindle bearing, indicated in its entirety by the reference numeral 13, and is held in place thereon by means of a radial flange 14 formed on the outer peripheral surface of the bearing member. The hub cap 9 is provided with a circumferential groove 15 around the edge that is clamped against the sleeve portion 8, and the bearing flange 14 is disposed in this groove with thrust washers 16 on either side thereof. A pressure grease fitting 20 is screwed into a suitably threaded aperture in the hub cap 9 and opens into the space between the hub member 7 and bearing member 13 for lubricating the bearing.

The bearing member 13 comprises a spindle portion 21 of chilled iron, and a supporting standard, or shank portion 22 of steel tubing, the latter being embedded for about two thirds of its length in the chilled iron spindle. The iron of the spindle fills the hollow center of the tubing to a point just short of the end thereof, and forms an iron core 23 that serves to reinforce the steel tubing to a certain extent against bending. The outer end of the steel tube, beyond the end of the core 23, is drilled perpendicular to the axis of the tubing to provide a hole 24 for a retaining cotter pin 25. The protruding shank 22 is adapted to be secured in a mounting bracket or other attaching means on the implement frame, and for the purpose of illustration I have shown the shank mounted on a bracket 26 in the form of a casting having a recess 30 in the face thereof and an aperture 31 in the center of the recess. The tubular shank 22 is passed through the aperture 31, and the sides of the recess 30 fit over the end of the bearing hub 7 in the manner of a cap, with bearing washers 32 disposed between the face of the recess 30 and the end of the hub 7. The side of the bracket 26 opposite the recess 30 is provided with a groove or notch 33 in which the end of the shank 22 rests, and an eye bolt 34 is used to hold the shank firmly seated in the groove. The shank 35 of the eye bolt is passed through an aperture 36 in the bracket, and is threaded to receive a nut 37 that bears against the bottom side of the bracket, drawing the supporting standard 22 down into the groove 33. The cotter pin 25 abuts against the end of the bracket 26 and holds the bearing member against endwise movement relative to the bracket in the direction of the disk.

In the making of the bearing member 13, I have found that the most satisfactory results are obtained by following a procedure substantially as follows:

The steel tubing 22 is placed in the drag of a chilled mold in an upright position, standing on the right end as viewed in Figure 2. A small quantity of sand is placed in the hollow center of the tubing and tamped down to provide a core at B in the lower end of the tube. The cope of the mold is then placed in position on the drag, with the parting line along the line A—A, and the molten iron poured into the mold from the top in such a manner that the center of the tube is filled with iron at the same time that the mold is filled. When the casting has cooled, it is removed from the mold, the sprues are cut off, and the hole 24 drilled in the end of the pipe that was cored at B. If the pipe is filled with iron all the way to the end, it is impossible to drill through the extremely hard chilled iron core.

What I claim as my invention is:

1. A bearing member comprising a spindle portion of extremely hard metal and a shank portion of ductile metal integrally imbedded within the spindle portion and projecting outwardly therefrom to provide mounting means for attachment to a supporting structure, said spindle portion surrounding said shank portion to provide an outer shell serving as a bearing surface.

2. A bearing member comprising a cylindrical spindle portion of relatively hard metal, and a tubular shank portion of relatively tough metal embedded within the spindle portion and completely closed at one end by said hard metal, the other end of said tubular shank portion projecting outwardly from the spindle portion, some of the metal of the spindle portion extending through the hollow center of the tubular shank for a portion of the length thereof and some of the metal of said spindle portion completely surrounding said shank portion adjacent said one end and forming a relatively thin walled shell of hard metal, the exterior of which forms a bearing surface.

3. A bearing member comprising a cylindrical spindle of cast metal, and a length of metal tubing embedded at one end within the spindle substantially parallel to the axis thereof and projecting axially outwardly from one end thereof to provide a supporting standard, some of the metal of said spindle completely surrounding said one end of said metal tubing and forming thereabout a shell of metal, the exterior of which forms a bearing surface, and some of the metal extending through the hollow center of said tubing axially thereof toward the other end of the tube to a point beyond the end of said shell of metal on the outside of the tube.

4. A bearing member comprising a cylindrical spindle of chilled iron having an exterior bearing surface, a tubular steel shank embedded for the greater part of its length within the spindle substantially concentric with the outer bearing surface thereof, said shank projecting axially outwardly from one end of the spindle, and some of the iron of said spindle extending into the projecting portion of the tubular shank to a point axially thereof beyond said bearing surface but short of the end of the projecting portion of the shank, the projecting end of the shank beyond the iron on the interior thereof having bracket receiving means.

5. A metal bearing member comprising a center portion, a cylindrical portion of tough metal encasing said center portion, an outer portion encasing said cylindrical portion and having a hard outer surface to resist wear, said center portion and cylindrical portion extending beyond said outer portion to form a shank.

6. The method of making a bearing member having a wheel receiving portion adjacent one end and a bracket receiving portion adjacent the other end, which method comprises casting iron around the outside of one end portion of a length of steel tubing to form a relatively thin walled bearing sleeve chilling the exterior portion of the cast iron around the outside of said portion of the tubing to form a bearing surface, filling the interior of at least a part of said end portion of the tubing with molten iron, and then cooling the tubing and the interior portion of the casting at substantially the same rate.

7. The method of making a bearing member which includes the steps of placing a length of steel tubing in an upright position in a chilled mold, filling the lower end of the tubing with a small quantity of sand, pouring molten iron into the mold so that some of the iron fills the center of the tube and the remainder of the iron fills the mold to form a chilled iron bearing sleeve around the outside of the tubing for a portion of the length thereof and with a chilled iron core in the tubing, and then drilling the end of said tubing.

8. The method of making a bearing member having a wheel receiving portion adjacent one end and a bracket receiving portion adjacent the other end, which method comprises casting iron around the outside of one end portion only of a length of steel tubing to form said wheel receiving portion, blocking off a short portion of the interior of said tubing at the other end and filling the remainder of the interior of said tubing with iron simultaneously with the casting of iron about the outside of said one end portion of the tubing.

9. The method of making a bearing member having a wheel receiving portion adjacent one end and a bracket receiving portion adjacent the other end, which method comprises blocking off the exterior of one end portion of the tubing to prevent molten iron from surrounding the same, blocking off a part of the interior of said other end portion, shorter than said exteriorly blocked off part, of said tubing, filling all of the interior of said tubing with molten iron except the blocked off part of the interior and casting iron about the other end portion only of said tubing.

10. A bearing member for lister cultivators and the like, comprising a spindle portion of cast metal having a hardened exterior bearing surface and a radially outwardly extending bearing flange adjacent one end, an open end tubular shank embedded within said spindle portion coaxially of said bearing surface and flange and projecting at one end outwardly of said spindle portion generally at the end thereof opposite said flange and reenforcing metal within the outwardly projecting portion of said tubular shank.

11. A bearing member as defined in claim 10, further characterized by said reenforcing metal extending within said tubular shank axially beyond said bearing surface and joined integrally with the metal of said spindle portion at the end of said tubular shank adjacent said radial flange.

12. A bearing member comprising a cast metal spindle section and a part embedded, at least at one end portion, within said cast metal spindle section, the mass of said part being small relative to the mass of metal that surrounds said end portion, whereby during the casting operation the temperature of said tubular part reaches substantially the temperature of said metal before the latter cools to a point where shrinkage begins.

13. A bearing member comprising a cast metal spindle section and a thin walled tubular part embedded within said spindle section, the outer diameter of said spindle section being a comparatively small amount greater than the outer diameter of said tubular part, whereby the radially outer portion of said spindle section is in the form of a shell surrounding the embedded portion of said tubular part, the mass of said tubular part that is embedded in said spindle section being only a fractional part of the mass of metal disposed in and around said tubular part, whereby during the casting operation the temperature of said tubular part reaches substantialy the temperature of the molten metal of the spindle section and in cooling shrinks at about the same rate thereby eliminating shrinkage cracks in the outer shell portion of said spindle section.

SWAN H. FORSBERG.